Patented Feb. 19, 1924.

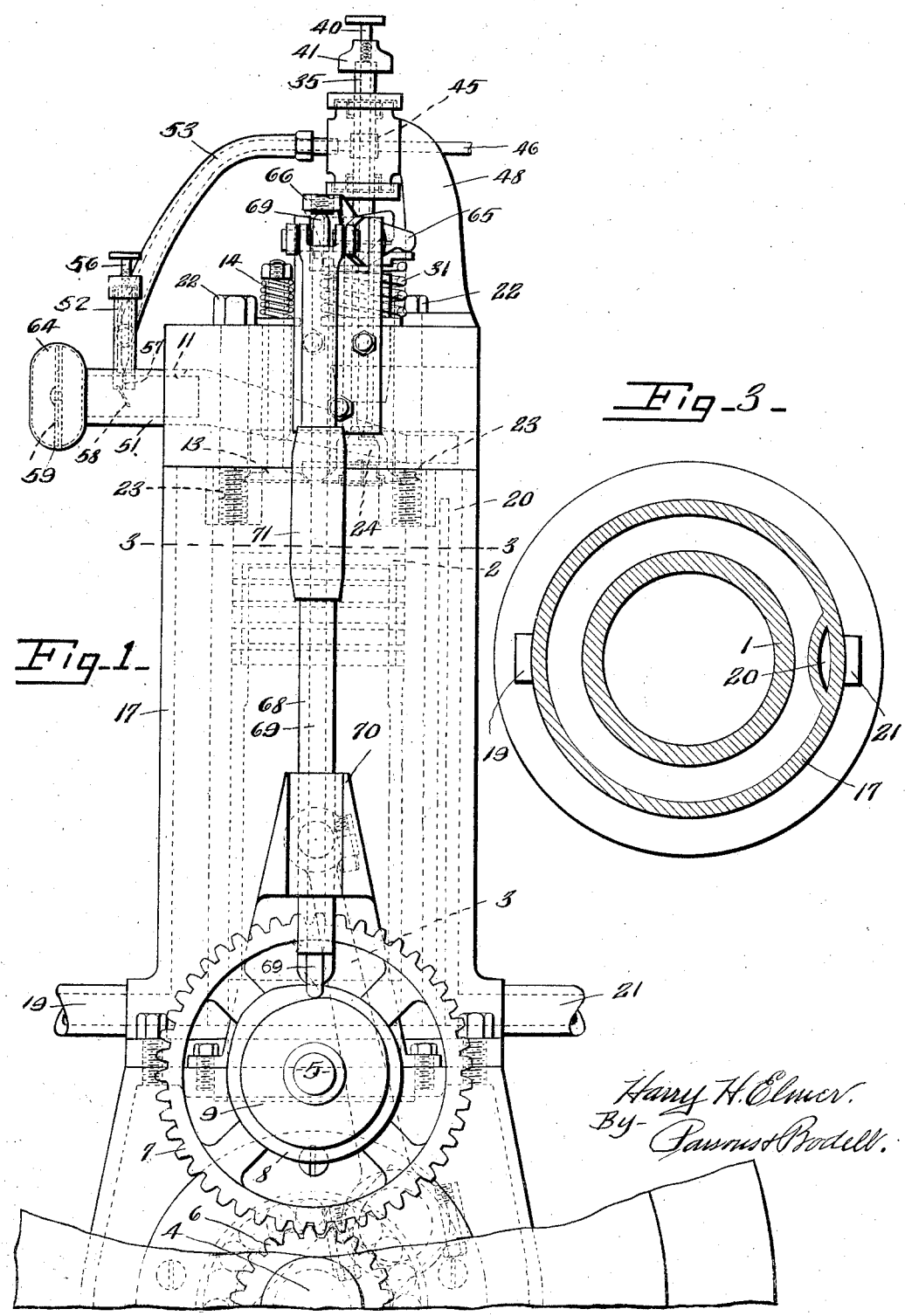

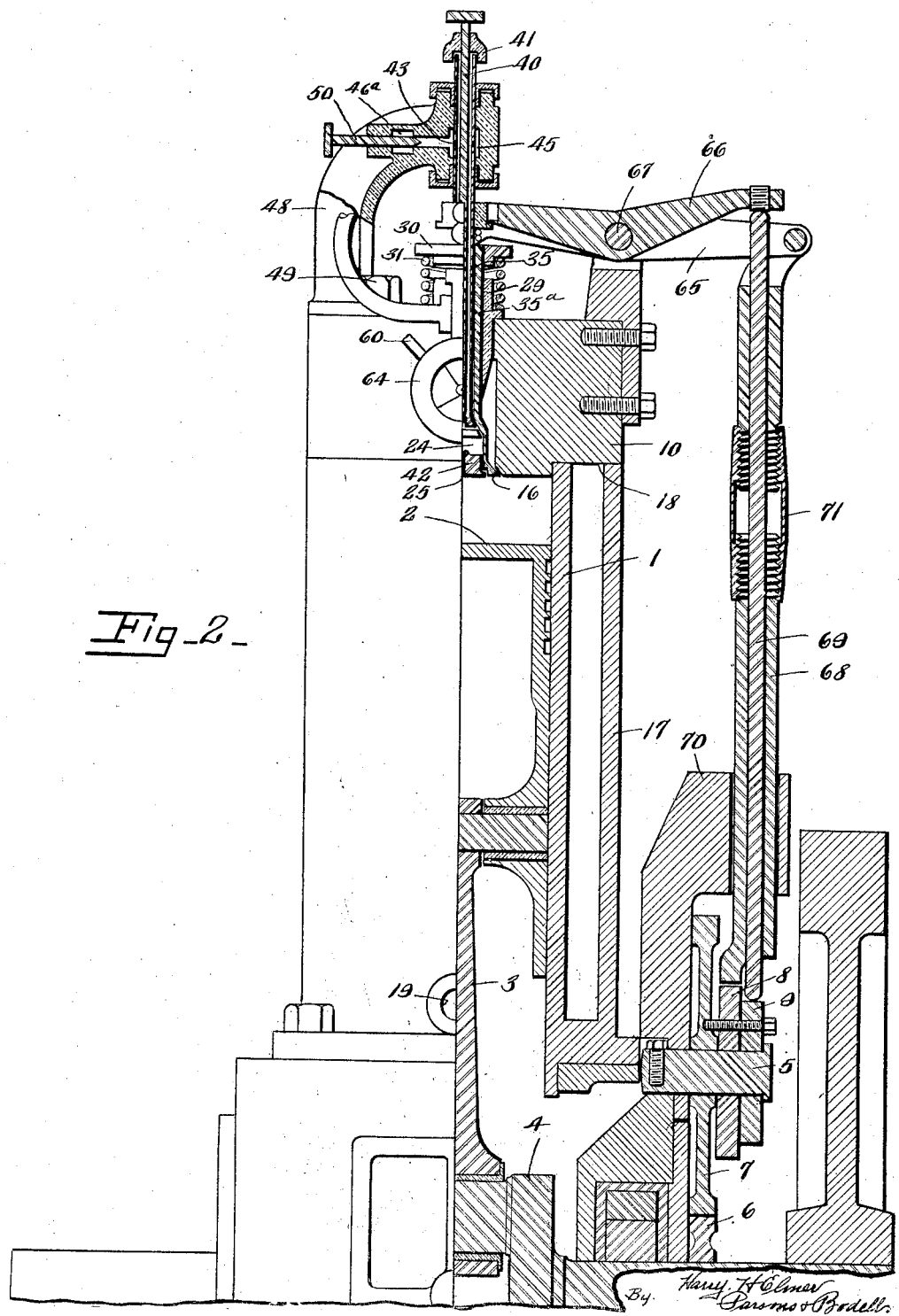

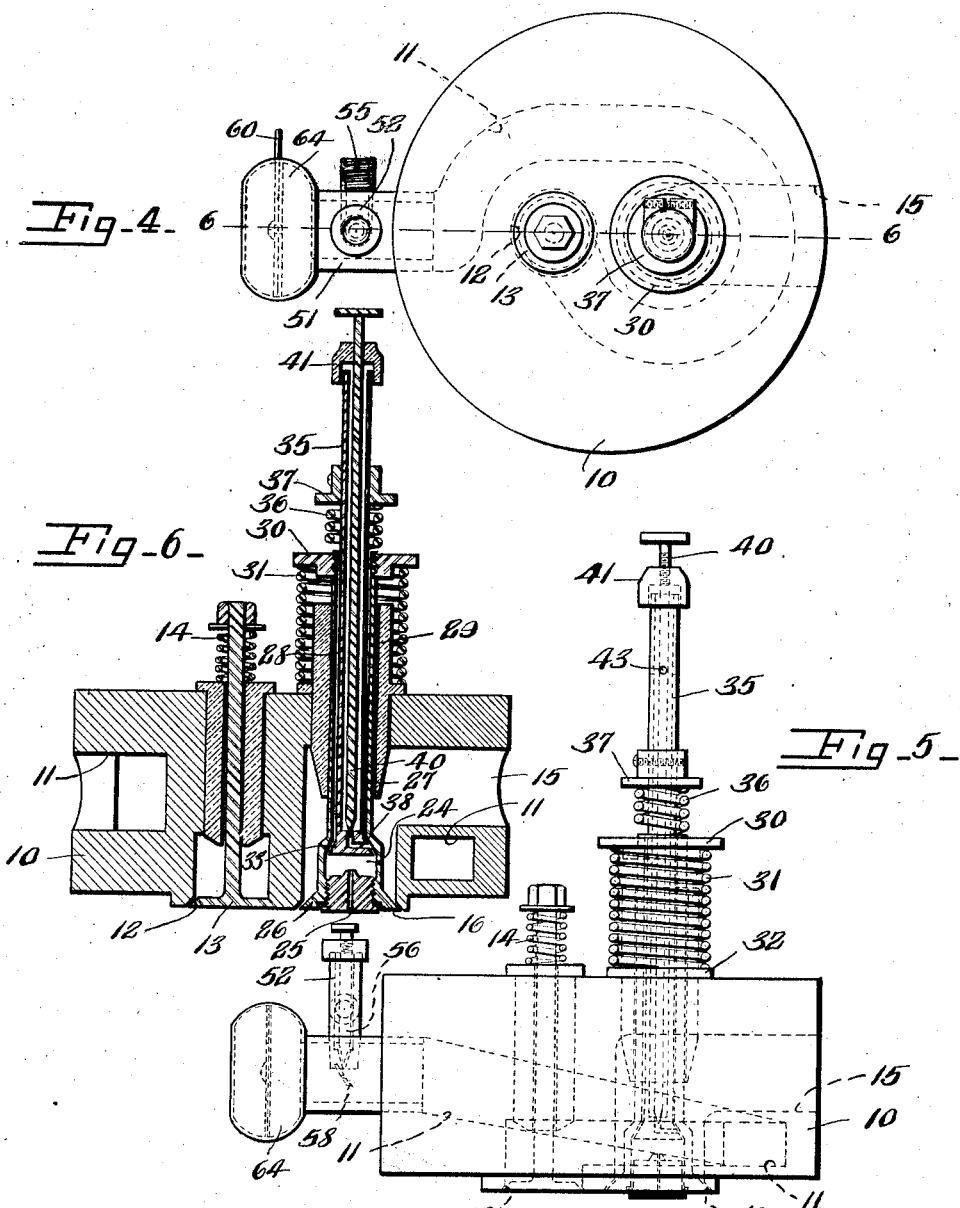

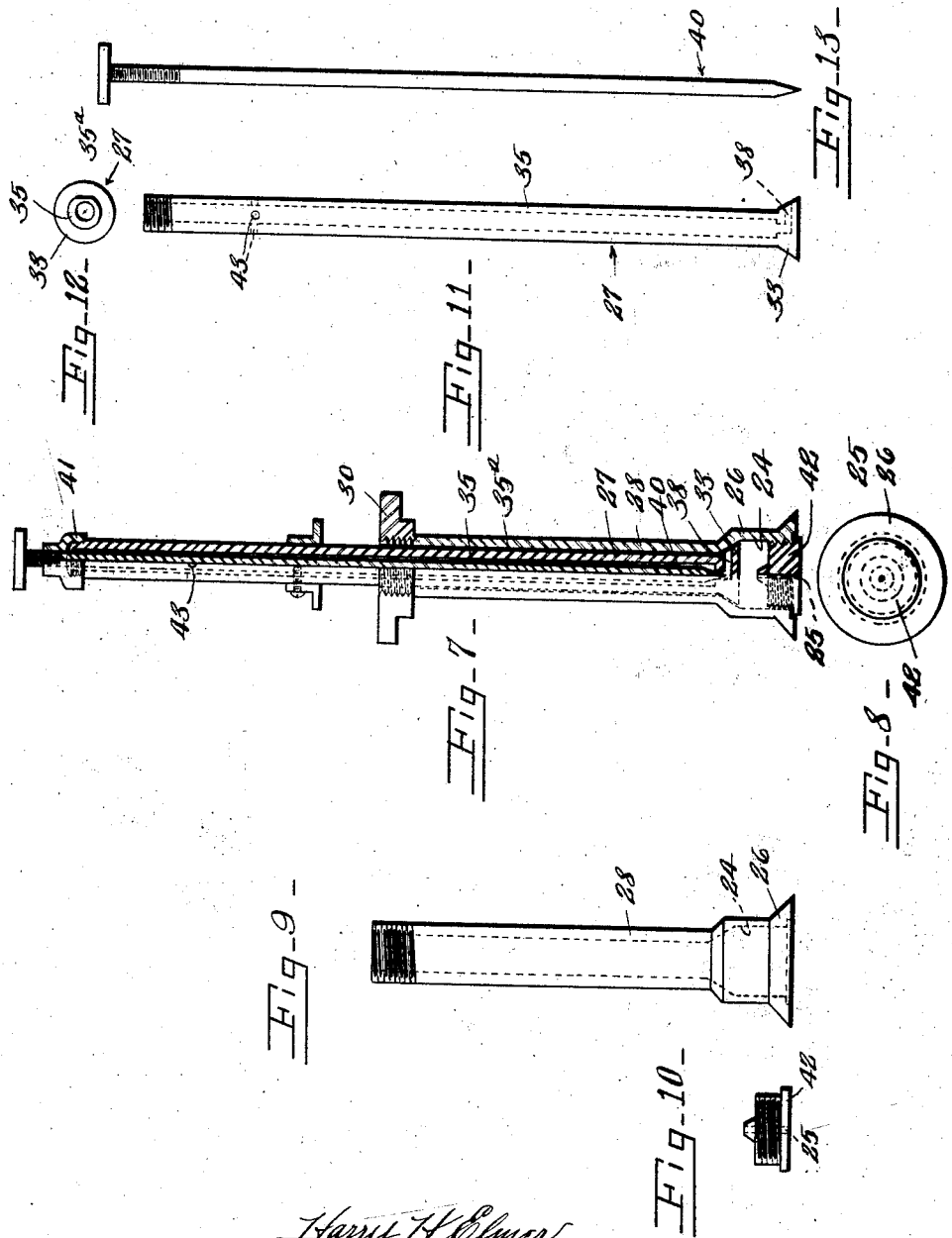

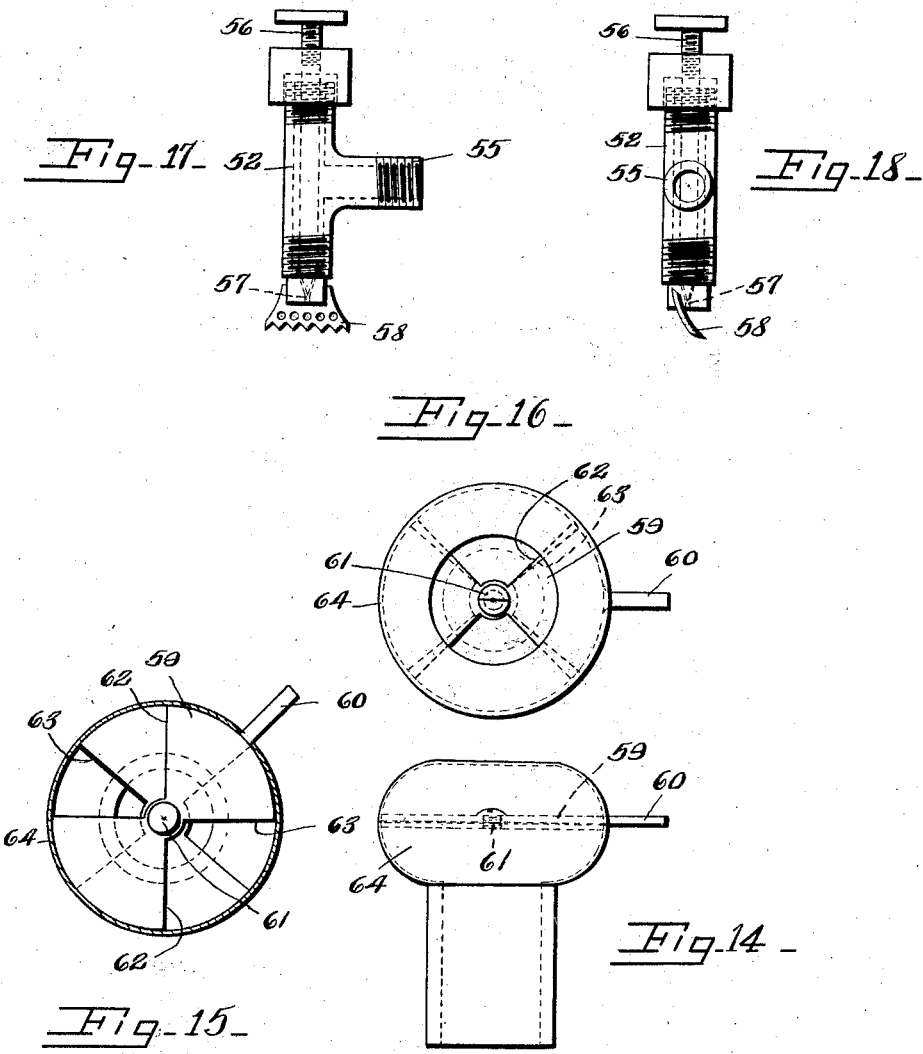

1,484,554

UNITED STATES PATENT OFFICE.

HARRY H. ELMER, OF SYRACUSE, NEW YORK.

INTERNAL-COMBUSTION ENGINE AND METHOD OF OPERATING THE SAME.

Application filed April 6, 1922. Serial No. 550,229.

*To all whom it may concern:*

Be it known that I, HARRY H. ELMER, a citizen of the United States, and a resident of Syracuse, in the county of Onondaga and State of New York, have invented a certain new and useful Internal-Combustion Engine and Method of Operating the Same, of which the following is a specification.

This invention has for its object a method of operating internal combustion engines, and an internal combustion engine operating in accordance with such method, which engine is particularly simple in construction, powerful and economical and highly efficient in operation and durable in use.

Other objects appear throughout the specification.

The invention consists in the method and in the novel features and in the combinations and constructions hereinafter set forth and claimed.

In describing this invention, reference is had to the accompanying drawings in which like characters designate corresponding parts in all the views.

Figure 1 is a fragmentary front elevation embodying my invention.

Figure 2 is an elevation partly in vertical section taken at a right angle to Fig. 1.

Figure 3 is a cross sectional view through the cylinder.

Figure 4 is a plan view of the head of the cylinder.

Figure 5 is an elevation of the head.

Figure 6 is a sectional view, parts being omitted, taken on line 6—6, Fig. 4.

Figure 7 is an elevation, partly in section, of the concentric exhaust and fuel valves.

Figure 8 is an end elevation of parts seen in Fig. 7.

Figure 9 is a detail view of the body of the exhaust valve.

Figure 10 is a detail view of the plug at the inner end of the exhaust valve.

Figure 11 is an elevation of the fuel valve.

Figure 12 is an end view thereof.

Figure 13 is a detail view of the control valve within the fuel valve.

Figure 14 is an elevation or plan view of the air intake pipe with the throttle or shutter.

Figures 15 and 16 are end views of parts seen in Fig. 14 showing the shutter or throttle partly open and wholly closed.

Figures 17 and 18 are elevations taken at a right angle to each other of the fuel or atomizing nozzle located within the intake pipe.

This method of operating internal combustion engines comprises generally, filling into the engine cylinder a combustion supporting atmosphere, compressing a combustible gas above the pressure of such compressed atmosphere, raising the temperature of the fuel at or above the ignition point thereof and injecting the gas thus formed into said atmosphere, so that the gas burns in the compressed combustion supporting atmosphere and hence develops the power for operating the engine.

The method may further comprise vaporizing or atomizing additional fuel in the combustion supporting atmosphere, that is, carburizing the atmosphere, which fuel is ignited and burns by the burning of the combustible fuel injected into the compressed atmosphere within the cylinder and hence boosts or increases the power of the engine.

More specifically, the method consists in compressing a liquid fuel in a confined chamber communicating through a jet opening into the cylinder, compressing the fuel in such chamber by the compression of the combustion supporting atmosphere in the cylinder under the influence of the piston during the compression stroke, until under such pressure and the heat generated, the fuel in the confined chamber, vaporizes and the pressure generated therein is greater than the pressure of the combustion supporting atmosphere so that the gasified fuel jets into such atmosphere and burns therein. After the engine is started the liquid fuel is volatilized in the generator chamber by the heat in the cylinder walls and its pressure increased above the pressure in the cylinder, so that it jets into the cylinder and burns in the air therein. Hence this method of operating the internal combustion engines such as here illustrated, in its entirety, comprises volatilizing the liquid fuel by heating the same in the confined chamber by heat generated during the operation of the engine thereby raising the temperature of the volatilized fuel and raising the pressure of the same, subjecting, through the jet opening communicating with the cylinder, the volatilized fuel in such chamber to the compression of a combustion supporting atmosphere within the engine cylinder during the compression stroke of the piston and thus additionally raising the temperature and pressure of the same above the pressure of such atmosphere and thereby causing the volatile fuel to jet into and burn in the compressed atmosphere in the cylinder and also causing the fuel in such atmosphere to burn.

The engine here illustrated is of the four cycle type and comprises the cylinder 1, the piston 2 movable in the cylinder and connected in the usual manner by a connecting rod 3 to the crank shaft 4. The crank shaft operates cams through gears 6 and 7, 8 and 9 are the cams on the cam shaft, they being shown as mounted on a stud 5.

The cylinder here shown is provided with a detachable head block 10 which is formed with an air inlet passage 11 which follows a circuitous course for the purpose to be hereinafter set forth, this inlet 11 opening at its inner end through a port 12 into the cylinder.

The port is controlled by an inwardly opening valve 13 which in this embodiment is opened by the suction created during the suction stroke of the piston and closed by a spring 14.

15 is the exhaust passage which has a port 16 opening into the cylinder.

The inlet 11 as before stated, follows a circuitous course and loops around the exhaust port, and acts to cool the exhaust and also to heat the incoming air or the incoming air containing the atomized fuel. The circuitous inlet also sufficiently cools the head block which is unprovided with a water jacket.

The cylinder wall is provided with a water jacket 17 which opens at 18 through the top of such wall, and the head 10 closes the upper open end of the water jacket 17 so that the water washes against the under side of the margin of the head.

The water is taken into the jacket at 19 at the lower end of one side thereof, and the jacket is provided with a lengthwise extending conduit 20, Figs. 1 and 3 here shown as cast integral therewith, this conduit terminating near the top of the jacket and communicating at its lower end with an outlet pipe 21, thus the water flows in at 19 at one side of the jacket, rises to the top of the jacket against the cylinder head and flows out through the passage 20 to the outlet pipe 21 on the other side of the cylinder.

The head 10 is secured in position by screws as screws 22 extending through the head, and threading into threaded passages 23 in the cylinder.

24 designates the confined fuel generating chamber which communicates through the jet opening 25 with the compression chamber of the cylinder, this generator chamber 24 being located in the wall or the head of the cylinder between the inner and outer faces of such wall or head so that the fuel in the chamber is volatilized by the heat held in the cylinder walls or associated parts. The generator chamber is here shown as formed in the exhaust valve 26 located in the exhaust port 16, although such chamber may be formed independently of the exhaust valve. By locating the generator chamber in the exhaust valve, it can be heated to a maximum extent and the cylinder head cooled to the necessary degree without cooling the generator materially.

27 is a fuel valve for controlling the flow of the liquid fuel into the generating chamber 24.

Preferably, the exhaust valve 26 and the fuel valve 27 are arranged concentric with each other, the exhaust valve 26 having a tubular stem 28 extending upwardly from the generating chamber 24 through the head or a suitable bushing 29, and having a collar 30 near its upper end which constitutes an abutment for a spring 31 located between the collar and the shoulder 32 on the bushing for holding the exhaust valve against its seat.

The fuel valve 27 is provided with a head 33 within the chamber 24, the head having a conical face which seats on a conical seat on a wall of the chamber 24. This fuel valve also has a tubular stem 35 sliding within the stem 28 of the exhaust valve and extending above the upper end of the stem 28.

A spring 36 is interposed between the upper side of the collar or spring seat 30 and a collar 37 on the stem 35 of the fuel valve, this spring tending to thrust the fuel valve upwardly into its closed position.

The head of the fuel valve 27 is formed with a duct or passage 38 leading from the interior of its hollow stem 35 through its seating face, and this duct is controlled, that is, the amount of oil or fuel to feed through this duct is controlled or measured by a needle valve 40 extending lengthwise of the tubular stem of the fuel valve and threading through a cap 41 at the upper end of the stem 35 of the fuel valve.

In order to prevent the generator chamber 24 from becoming air bound and to facilitate the flow of fuel thereinto said chamber communicates with the outer air and in the illustrated embodiment, the air passage is provided by flattening the stem 35 on one side forming a passage 35$^a$. Said passage 35$^a$ is thus controlled by the head 33 of the fuel valve 27.

The jet opening 25 is here illustrated as formed in a plug 42 inserted in the head of the exhaust valve 26.

The stem 35 of the fuel valve 27 is connected to a suitable fuel supply or feed line, and as shown in Fig. 2, this stem is provided with transverse passages 43 opening into a chamber 45 surrounding the stem 35 and communicating with a passage 46a connected by a pipe 46 to a suitable tank or other fuel supply.

The chamber 45 is here shown as supported by a bracket 48 mounted on the head 10 of the cylinder and secured thereto in any suitable manner as by cap screws 49. Also, a suitable needle valve 50 is provided for regulating the flow of fuel from the pipe 46 and passage 46a into the chamber 45. The stem 35 of the fuel valve 27 slides in the bracket 48 through the chamber 45, and hence the valve stem is guided by the bracket.

The inlet 11 is provided with a suitable inlet pipe 51 having throttle means at its outer end and also means is provided for conducting the fuel into the intake 51, this means being here shown as an atomizing nozzle 52 arranged in the intake pipe 51 and connected to the fuel supply pipe in any suitable manner, as by a pipe 53 connected at one end to the passage 46a of the bracket 48 and at its other end to a nipple 55 on the nozzle 52.

The feed of the fuel to the nozzle is controlled by a suitable needle valve 56 associated with the nozzle 52. The nozzle as here shown terminates in a jet opening 57 arranged to project the jet against a spray plate 58 carried at the lower end of the nozzle.

The throttle at the outer end of the intake pipe 51 may be of any suitable construction, and as here illustrated, comprises a register or shutter 59 movable by a suitable lever 60 about an axis 61 and having openings as quadrantal openings 62 arranged to be brought into and out of alinement, partly or wholly, with similar openings 63 in the end wall of the casing 64 for such throttle.

The exhaust valve 26 and the fuel valve 27 are operated from the cams 8 and 9, and the means for operating them comprises the cams 8, 9, rocker arms 65, and 66 mounted on an axis 67, like ends of the rocker arms pressing against the collars 30 and 37 respectively on the stems of the exhaust and fuel valves 26, 27, and the other ends of the rocker arms coacting with lifter rods which coact with the cams 8 and 9.

As here shown, the lifter rods are concentrically arranged and the lifter rod 68 for the rocker arm 65 is tubular and the lifter rod 69 for the rocker arm 66 slides in the tubular lifter rod 68.

The rod 68 is guided in the suitable bracket 70 supported on the engine base and also this rod is formed in sections adjustable lengthwise relatively to each other as by a turnbuckle or other right and left hand screw thread connection 71.

In operation, during the suction stroke of the engine, a combustion supporting atmosphere or air is drawn into the engine cylinder. Also, the fuel valve 27 is opened to permit liquid fuel to pass through its hollow stem 35, the duct 38, into the generator chamber 24. During the compression stroke of the piston, the air is compressed in the cylinder and the pressure transferred through the jet 25 to the fuel within the generator chamber 24.

The pressure at first in the cylinder and in the generator chamber 24 is equal, but the fuel becomes heated and expands under the pressure until the pressure in the generator chamber 24 is greater than that in the cylinder whereupon the now volatilized and heated fuel jets through the jet opening 25 into the cylinder and as its temperature is above the ignition point it burns in the combustion supporting atmosphere and creates the power to impel the piston on its power stroke.

At the end of the power stroke the exhaust valve is opened so that during the exhaust stroke the cylinder is scavenged. After the engine has been started the liquid oil in the generator chamber 24 is quickly volatilized by the heat of the exhaust gases and the heated cylinder so that the amount of fuel to be passed into the generator chamber can be cut down if desired by turning the needle valve 40.

To increase the power of the engine when necessary, that is, to boost the engine, the needle valve 56 can be opened more or less permitting atomized fuel to enter the cylinder with the incoming air or combustion supporting atmosphere. This booster charge is ignited by the burning of the charge from the generator chamber 24. At certain speeds and loads the booster charge is not used, and the booster may be used for quick acceleration or for peak loads.

When the booster charge is used, the engine is controlled by operating the throttle 59. For further reduction the valve 56 is operated to control the amount of fuel going into the air inlet 11; and for further reduction the initial charge to the generator chamber 24 is controlled by operating the needle valve 40.

The charge in the generator chamber may be sufficient to "idle" the engine, that is, to keep it running with the ordinary load or with no load. It is sufficient, however, that this charge be enough to create power to idle the engine and the booster charge taken in through the air inlet 11 relied on to create power to do work. Also, when the engine is started and the idling charge taken in, the valve 38 can be entirely cut off and the engine running solely on the booster charge taken in through the air inlet 11. During such operation, it is probable that, during the compression stroke, some of this charge enters the generator chamber 24 through the passage 25 during the compression stroke and is there volatilized and generated into a gas and forced back into the combustion supporting atmosphere in the cylinder by the increased pressure generated by the volatilization thereof, and hence burns in the cylinder and ignites the combustible charge therein. Preferably the generator chamber and its jet passage are proportioned to receive and volatilize a charge that will run the engine with the ordinary load for which the engine is built to carry, and the booster charge used for acceleration and increased power.

An engine operating in accordance with my method is very easily started, developes high speed, and power, is very flexible or sensitive to the throttle, utilizes cheaper fuel as fuel oil, is economical in fuel as well as powerful, and is much lighter in weight than other engines of the type not having spark plugs or ignition systems. In fact my engine is not heavier than engines of similar power using electric ignition to ignite the fuel charge in the cylinder such as engines used in motor vehicles. Owing to the light weight, high speed and power, and the flexibility of this engine, it is adapted for use in motor boats, motor trucks, and automobiles, as well as for stationary uses for which heavier engines are now employed.

What I claim is:

1. The method of operating internal combustion engines comprising filling into the engine cylinder a combustion supporting atmosphere containing therein a combustible fuel and injecting into such atmosphere a combustible volatilized fuel uncombined with a combustion supporting atmosphere, at a temperature at or above the ignition point of such fuel.

2. In an internal combustion engine, the combination of a cylinder, a piston movable in the cylinder, the cylinder having a valve controlled inlet for a combustion supporting atmosphere and a valve controlled exhaust, a confined generator chamber for a liquid fuel arranged in a cylinder wall between the inner and outer faces thereof, such generator chamber being substantially closed to the inlet of air and having an open unobstructed jet passage into the combustion space of the cylinder, a valve for controlling the flow of fuel into such chamber, and mechanism for operating and timing the operation of the last mentioned valve and the exhaust valve.

3. In an internal combustion engine, a cylinder, a piston movable in the cylinder, the cylinder having air inlet and exhaust ports and valves for controlling such ports and a confined generator chamber for receiving a liquid fuel such chamber being substantially closed to the inlet of air, and having an open unobstructed jet passage into the cylinder, a liquid fuel supply connected to said chamber and to the air inlet, and means for controlling and timing the flow of liquid fuel to said chamber, and means for controlling the amount of fuel to the air inlet.

4. In an internal combustion engine, a cylinder, a piston movable in the cylinder, the cylinder having air inlet and exhaust ports, a confined generator chamber for receiving liquid fuel, such chamber being substantially closed to the inlet of air and having an open unobstructed jet opening into the cylinder, a fuel supply connected to said generator chamber and to said air inlet port and means for controlling and timing the flow to said chamber.

5. In an internal combustion engine, a cylinder having an intake port for a combustion supporting atmosphere and an exhaust port, means for supplying a combustible fuel to the intake port, means for controlling the opening and closing of said intake; a piston movable in the cylinder and a confined generator chamber for receiving unvolatilized fuel, such chamber being substantially closed to the inlet of air and having an open unobstructed passage into the cylinder.

6. In an internal combustion supporting engine, a cylinder, a piston movable in the cylinder, the cylinder being formed with valve controlled air intake and exhaust ports, automatically operated valves for opening and closing said ports, a throttle valve for controlling the air intake, a throttle valve for controlling the flow of combustible fuel into the air intake, and a confined generator chamber for liquid fuel, having an intake for such fuel, the chamber being substantially closed to the inlet of air and having an open unobstructed jet passage into the cylinder, an automatically operated valve for controlling and timing the flow of fuel into the generator chamber, and a throttle valve in the intake of the generator chamber.

7. In an internal combustion engine, a cylinder, a piston movable in the cylinder, the cylinder being formed with valve controlled air intake and exhaust ports, operator-operated means for controlling the flow of the combustible fuel into the air intake, and a confined generator chamber having open jet passage leading into the cylinder, said generator chamber being located in the exhaust valve.

8. In an internal combustion engine a cylinder, a piston movable in the cylinder, the cylinder having a valve controlled inlet for a combustion supporting atmosphere and an exhaust port, a valve controlling the exhaust port, means for cooling the cylinder about the exhaust port, a confined generator chamber for receiving a liquid fuel, said chamber being located in the exhaust valve between the inner and outer faces of the cylinder whereby the fuel is volatilized in the chamber, such chamber being substantially closed to the inlet of air and having an open unobstructed jet passage into the combustion space of the cylinder, a valve for controlling the flow of fuel into the generator chamber, and means for operating and timing the operation of the exhaust and fuel inlet valves.

In testimony whereof, I have hereunto signed my name, at Syracuse, in the county of Onondaga, and State of New York, this 28th day of March, 1922.

HARRY H. ELMER.